(12) United States Patent
Gan

(10) Patent No.: US 6,377,450 B1
(45) Date of Patent: Apr. 23, 2002

(54) SHOCK ABSORBING BRACKET FOR DATA STORAGE DEVICE

(75) Inventor: Li Yuan Gan, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/748,845

(22) Filed: Dec. 26, 2000

(51) Int. Cl.[7] .................................................. G05F 1/16
(52) U.S. Cl. ...................... 361/685; 361/683; 361/686; 361/724; 361/725; 312/223.2; 248/694
(58) Field of Search ................................. 361/683–686, 361/679, 724–727; 248/632, 694; 360/97.02; 312/9.9, 223.1–223.3, 351

(56) References Cited

U.S. PATENT DOCUMENTS

| | | | | |
|---|---|---|---|---|
| 5,333,098 A | * | 7/1994 | Deluca et al. | 361/685 |
| 5,402,308 A | * | 3/1995 | Koyanagi et al. | 361/685 |
| 5,463,527 A | * | 10/1995 | Hager et al. | 361/685 |
| 6,283,438 B1 | * | 9/2001 | Shimada et al. | 248/694 |

* cited by examiner

Primary Examiner—Darren Schuberg
Assistant Examiner—Yean-Hsi Chang
(74) Attorney, Agent, or Firm—Wei Te Chung

(57) ABSTRACT

A shock absorbing bracket for a data storage device (90) includes a body (40) and a pair of rubber spacers (60). The body has a base (42) and two side walls (44). Three through holes (52) are defined in each side wall, each hole having an internal annulus (53) formed thereat. A plurality of notches (54) is dented into edges between the base and side walls, thereby forming internal wedges. Each rubber spacer includes a vertical beam (62) and a horizontal sill (64) extending inwardly from the beam. Three recessed rings (66) are formed in an outer surface of the each beam, coaxial with through apertures (68) defined in the beam. Circular grooves (70) are defined around the rings, for receiving the annuli of the body. A plurality of nicks (72) is defined at in edge between each beam and each sill, for engaging with the wedges of the body.

9 Claims, 3 Drawing Sheets

SHOCK ABSORBING BRACKET FOR DATA STORAGE DEVICE

BACKGROUND OF THE INVENTION

1. Field of the Invention

The present invention relates to a shock absorbing bracket, and in particular to a shock absorbing bracket for a data storage device.

2. Related Art

Data storage devices normally used in a personal computer include a hard disk drive (HDD), a floppy disk drive (FDD) and a compact disk read-only memory (CD-ROM) drive. Developments in today's highly information-intensive society have resulted in HDDs with faster and faster operating speeds. Vibration generated by HDDs has increased accordingly, making computer systems more prone to instability or even damage.

Conversely, HDDs and other data storage devices also need protection from vibration or shock which occurs elsewhere in the computer system.

Taiwan Patent Application No. 8220432 shows a conventional drive bracket. The drive bracket does not need screws to be fixed to the computer enclosure. A conventional HDD is slid into the drive bracket alone rails. An end portion of the HDD has a plurality of teeth, to engage with ratchets of a resilient end portion of the drive bracket. An arc-shaped tab is formed at each side of the HDD for pressing side walls of the bracket, thus preventing the HDD from moving. However, the attachment between the HDD and the bracket is rigid. Excessive vibration and force can still pass between the HDD and the bracket.

Thus an improved means of absorbing vibration and force in the vicinity of a computer data storage device is desired.

SUMMARY OF THE INVENTION

Accordingly, an object of the present invention is to provide a shock absorbing bracket for a data storage device which has good shock absorbing efficiency.

Another object of the present invention is to provide a shock absorbing bracket for a data storage device, the shock absorbing bracket having a simple configuration.

To achieve the above-mentioned objects, a shock absorbing bracket for a data storage device comprises a body and a pair of rubber spacers. The body includes a base and two side walls. Three through holes are defined in each side wall, each through hole having an internal annulus formed thereat. A plurality of notches is dented into edges between the base and the side walls, thereby forming internal wedges. Each rubber spacer comprises a vertical beam and a horizontal sill extending inwardly from the beam. Three recessed rings are formed in an outer surface of each beam, coaxial with through apertures defined in the beam. Three circular grooves are defined around respective recessed rings, for receiving the annuli of the body. A plurality of nicks is defined at the edge between each beam and each sill, for engaging with the wedges of the body.

Other objects, advantages and novel features of the present invention will be drawn from the following preferred embodiment with attached drawings, in which:

DESCRIPTION OF THE PREFERRED EMBODIMENT

Figure 1:
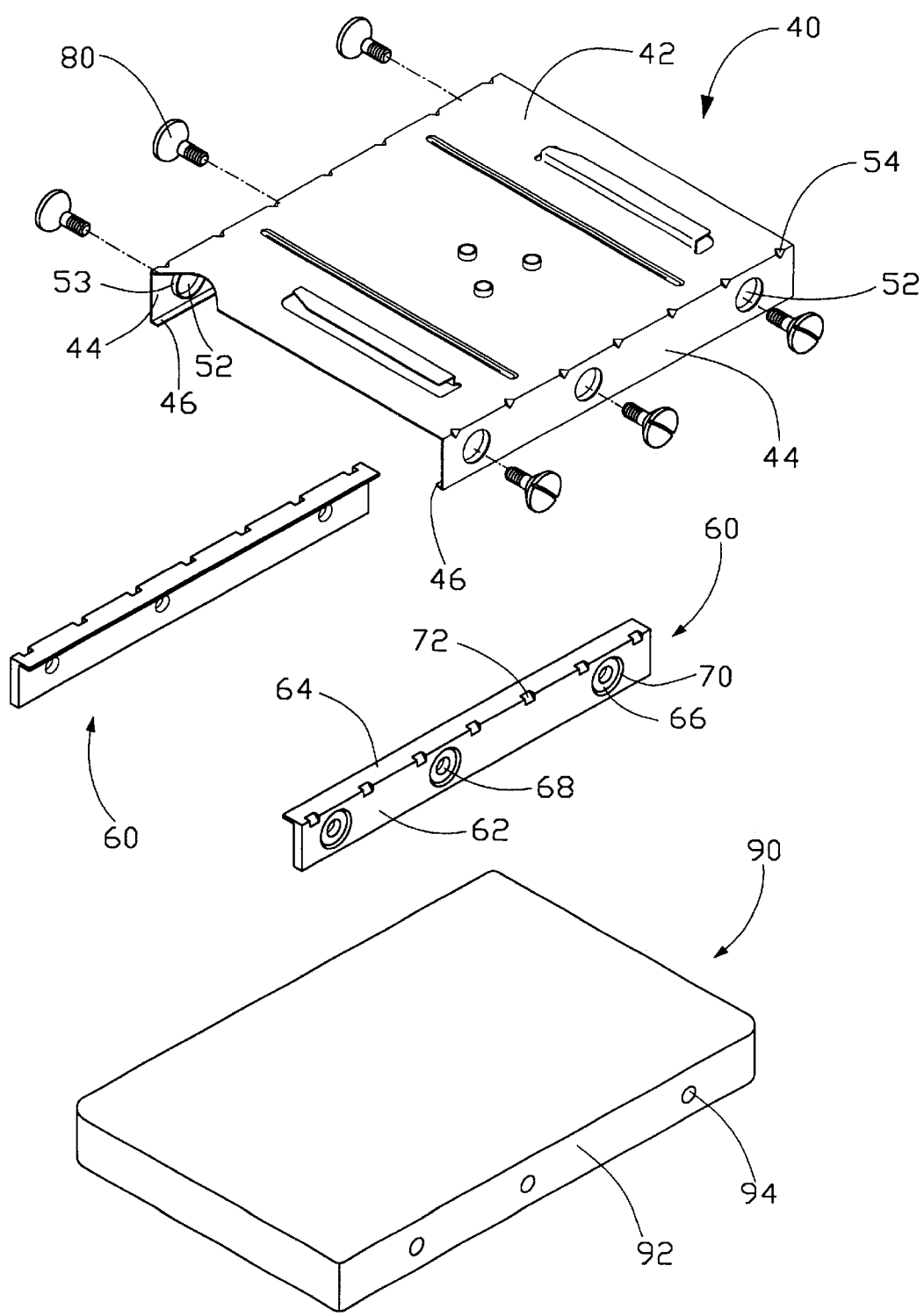
FIG. 1 is an exploded view of a shock absorbing bracket in accordance with the present invention, together with a hard disk drive (HDD)

Referring to FIG. 1, a shock absorbing bracket of the present invention includes a body 40, a pair of rubber spacers 60, and a plurality of screws 80. The body 40 includes a rectangular base 42 and two side walls 44 depending from respective opposite sides of the base 42, together defining a space (not labeled) for receiving a hard disk drive (HDD) 90 therein. Depending on a user's particular requirements, the body 40 can also receive a floppy disk drive, a CD-ROM drive or other kinds of drives. Two opposing supporting flanges 46 extend inwardly from respective opposite side walls 44 of the body 12. Three through holes 52 are defined in each side wall 44 of the body 40, corresponding to screw holes 94 defined in each side 92 of the HDD 90. An annulus 53 is formed on an internal surface of each side wall 44 at each through hole 52. A plurality of notches 54 is dented into external edges between the base 42 and each side wall 44. A corresponding plurality of wedges (not visible) is thus formed at internal edges between the base 42 and each side wall 44. Six screws 80 secure the body 40 to the HDD 90.

Each rubber spacer 60 includes a vertical beam 62, and a sill 64 extending, perpendicularly inwardly from an upper edge of the vertical beam 62. Thus the rubber spacer 60 forms an "L" profile. Three circular grooves 70 are defined in an outer surface of each beam 62, corresponding to the annuli 53 of the body 40. Three through apertures 68 are defined in each beam 62, coaxial with respective circular grooves 70. Accordingly, three rounded recessed rings 66 are formed in the outer surface of each vertical beam 62, coaxial with the respective apertures 68 and circular grooves 70. Outer surfaces of the recessed rings 66 on each beam 62 are coplanar, and are disposed inwardly from the outer surface of the beam 62. A plurality of nicks 72 is defined at an edge between the beam 62 and the sill 64, corresponding to the notches 54 of the body 40.

Figure 2:
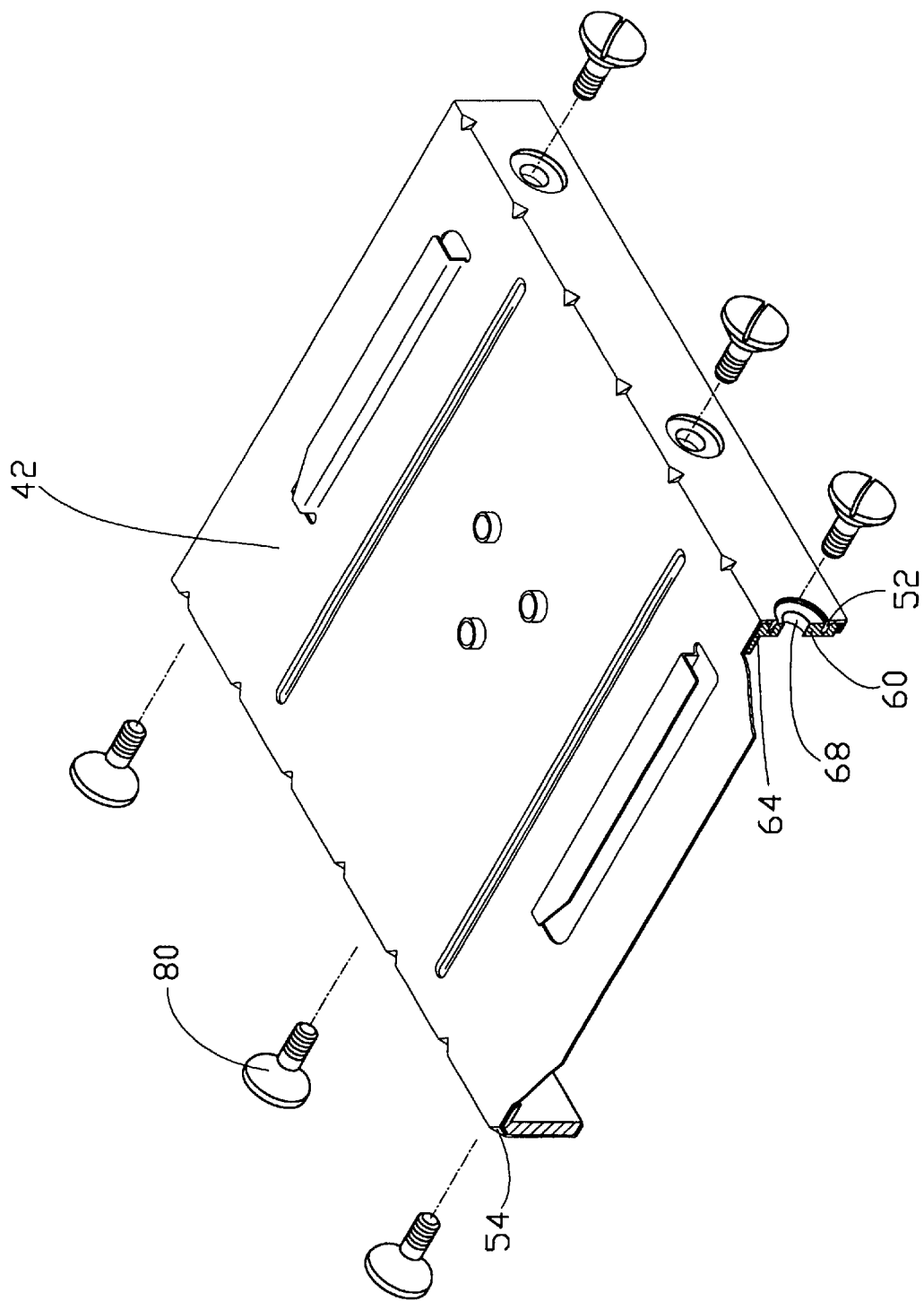
FIG. 2 is a partially assembled view of the shock absorbing bracket.
Figure 3:
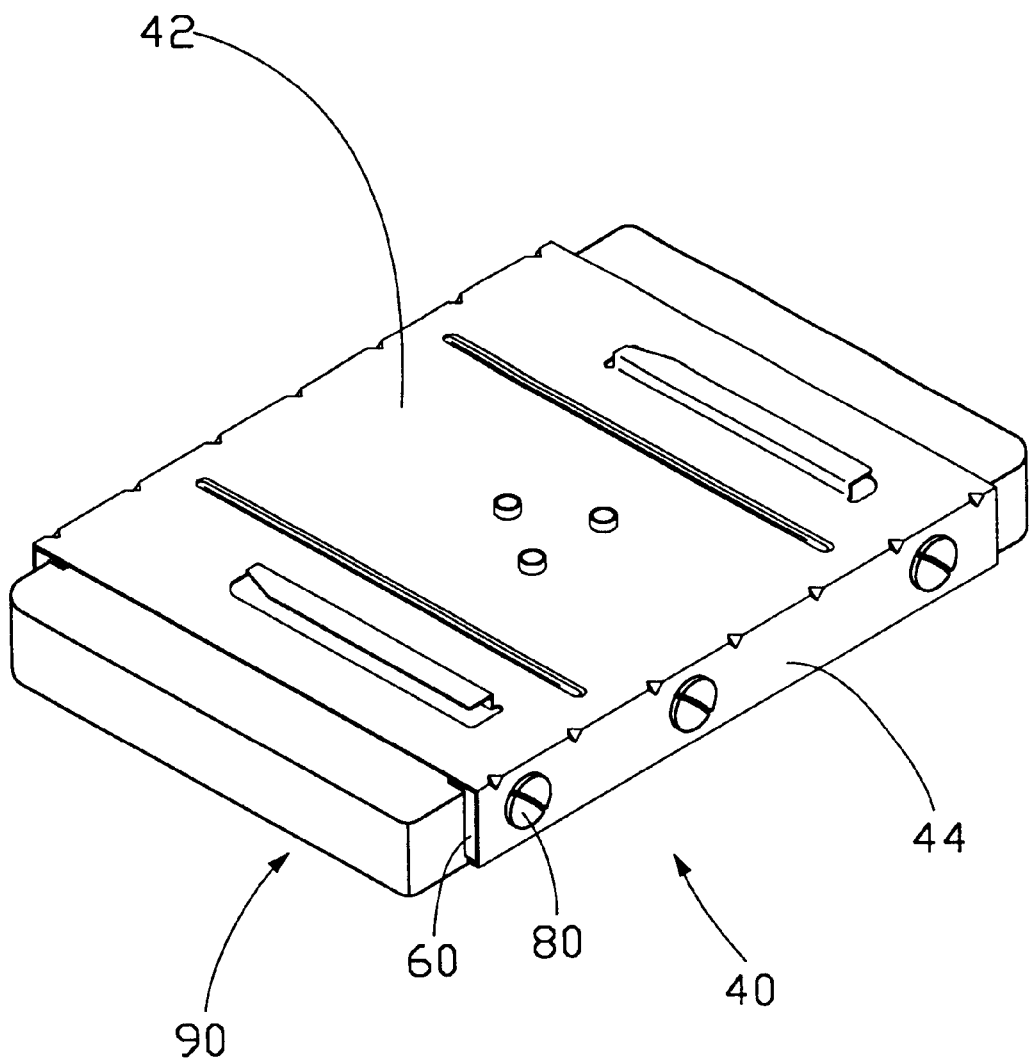
FIG. 3 is a fully assembled view of the shock absorbing bracket and HDD.

Referring also to FIGS. 2–3, in assembly, the pair of rubber spacers 60 is placed on respective opposing inner surfaces of the side walls 44 of the body 40. The annuli 53 of the body 40 enter the circular grooves 70 of the rubber spacers 60. The wedges (not visible) of the body 40 engage with the nicks 72 of the rubber spacers 60. Therefore, each rubber spacer 60 is securely attached to the body 40, sitting between the base 42, the side wall 44 and the supporting flange 46. Then the HDD 90 is inserted into the receiving space (not labeled) of the body 40 between the rubber spacers 60. The screws 80 are extended through the through holes 52 of the body 40 and the through apertures 68 of the rubber spacer 60, to engage with the screw holes 94 of the HDD 90. Thus the HDD 90 is firmly attached to the body 40. Then the combined shock absorbing bracket and HDD 90 are attached to a computer enclosure (not shown). Thus the computer enclosure and components therein are protected from vibration generated by the HDD. Similarly when the computer enclosure is subjected to vibration or shock, the HDD 90 is protected.

It is understood that the invention may be embodied in other forms without departing from the spirit thereof. Thus the present example and embodiment are to be considered in all respects illustrative and not restrictive, and the invention is not to be limited to the details given herein.

What is claimed is:

1. A shock absorbing bracket for a data storage device comprising:
   a body comprising a base and two side walls extending from opposite sides of the base, the side walls defining at least one through hole therein and forming at least one annulus at the at least one through hole; and
   at least one spacer comprising a beam, an outer surface of the beam defining at least one circular groove for engagingly receiving the at least one annulus of the body, whereby the spacer is engaged with the body.

2. The shock absorbing bracket as described in claim 1, wherein the spacer is made of rubber.

3. The shock absorbing bracket as described in claim 1, wherein the beam of each spacer forms a recessed ring at each circular groove thereof.

4. The shock absorbing bracket as described in claim 3, wherein each spacer defines a through aperture at each recessed ring thereof.

5. The shock absorbing bracket as described in claim 1, wherein the spacer further comprises a sill extending from the beam.

6. The shock absorbing bracket as described in claim 1, wherein at least one notch is dented into at least one edge between the base and the side walls of the body thereby forming at least one wedge, and wherein at least one nick is defined in an edge between the beam and the sill of the at least one spacer, for engaging with the at least one wedge.

7. The shock absorbing bracket as described in claim 1, wherein two opposing supporting flanges extend inwardly from respective opposite side walls of the body.

8. A shock absorbing bracket assembly comprising:
   a bracket body including a base and two opposite side walls extending in a longitudinal direction from two opposite side of the base, a plurality of screw holes formed in said side walls;
   a data storage adapted to be received within said bracket body and defining a plurality of holes in alignment with said screw holes wherein
   said bracket body and said data storage are mutually dimensioned to leave a proper space between each of said side walls and said storage, and
   a rubber spacer is disposed in said space and extends along said longitudinal direction with a plurality of through apertures in alignment with the corresponding screw holes and the corresponding holes, respectively.

9. The assembly as described in claim 8 wherein said spacer defines an L-shaped cross-section respectively abutting against the base and the side wall of the bracket body.

* * * * *